A. J. BROWN.
BEARING.
APPLICATION FILED JULY 26, 1917.

1,279,644.

Patented Sept. 24, 1918.

Inventor
A. J. Brown
by
Attorney

UNITED STATES PATENT OFFICE.

ARTHUR J. BROWN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

BEARING.

1,279,644.  Specification of Letters Patent.  Patented Sept. 24, 1918.

Application filed July 26, 1917. Serial No. 183,373.

*To all whom it may concern:*

Be it known that I, ARTHUR J. BROWN, a citizen of the United States, residing at Milwaukee, in the county of Milwaukee and State of Wisconsin, have invented a certain new and useful Improvement in Bearings, of which the following is a specification.

This invention relates in general to bearings, and has particular relation to bearings, especially those of the thrust type, wherein special provision is made for reducing friction through the production of a film of lubricating fluid under pressure between the relatively movable bearing surfaces.

It is an object of this invention to provide a bearing of improved design and construction.

It is a further object of this invention to provide a bearing of improved design and construction, wherein, during operation, a film of lubricating material under pressure is formed between the relatively movable and engageable bearing elements.

It is a further object of this invention to provide a thrust bearing of improved design and construction wherein one of the relatively movable bearing elements is of segmental form, and the bearing includes means associated with the segmental bearing element for automatically causing the production of a film of lubricating fluid under pressure between such segmental bearing elements and the bearing element coöperative therewith.

It is a further object of this invention to provide a thrust bearing of improved design and construction wherein one of the relatively movable bearing elements is in the form of or includes a plurality of segments of such a character and so arranged relatively to each other as to automatically act to equalize the thrust or pressure thereon due to the other one of the relatively movable bearing elements.

These and other objects and advantages are attained by this invention, the various novel features of which will appear from the description and drawings, disclosing one embodiment of such invention, and will be particularly pointed out in the claims.

Figure 1:
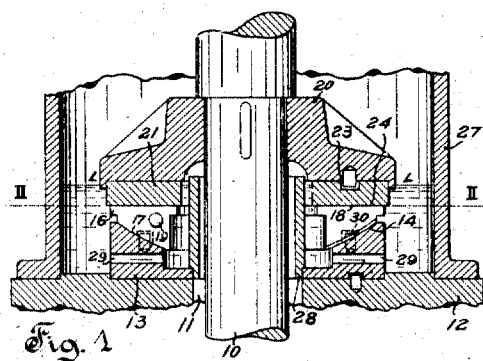
Figure 1 is a fragmental sectional elevation of apparatus provided with a thrust bearing embodying features of this invention.

In the embodiment of the invention illustrated in Figs. 1 to 5 of the drawings, the shaft 10 of a machine, which may be considered a vertical shaft machine of any desired character, passes through a central opening 11 in a bearing support 12. An annular base 13, here shown as being in the form of a single piece collar, is mounted on the support 12, being held against rotation in any suitable manner, as by means of a pin or dowel in one member coöperative with the walls of a slot in the other member, as indicated in Fig. 1. This base 13 is provided on its upper side with a spherical seat, indicated at 14. A segmental bearing element 15 is made of a plurality of, here shown as six, similar shoes or segments 16 provided with spherical seats 17 on their under sides of the same curvature as the seat 14 of the base 13 on which said segments rest. The segments 16 have machined bearing surfaces 18 on their upper sides, the bearing surfaces of the several segments preferably having the same angular relation to their respective spherical seats 17. These segments are preferably spaced apart to an appreciable extent, as indicated, by round headed pins 19 secured to one radial edge of each of the segments and bearing against the opposing radial edge of an adjacent segment. In addition to spacing the segments apart, these pins serve to limit the radially inward and downward movement of the segments on the spherical seat 14 of the base 13 and generally to maintain the segments in the proper position relative to the base 13, in other words, the segments coöperate through the pins to maintain their proper positions.

An annular support or thrust collar 20 is keyed or otherwise fixed to the shaft 10 to rotate therewith, and this collar carries or rests on an annular bearing element 21, which may be in the form of a single piece ring or collar, the bearing element being connected in driving relation with and held against appreciable movement relative to the support 20 by means of a pin and slot arrangement, indicated at 23. This bearing collar 21 rotatable with the shaft, has a machined bearing surface 24 on its under side which coöperates with the bearing surfaces 18 on the upper side of the segments 16, and through which the thrust of the shaft 10 and the parts rotatively associated therewith is transmitted to the relatively fixed bearing elements and the support therefor. In order to avoid any scraping that might otherwise occur and to provide a slight oil feed pocket, the radial edges of the bearing faces 18 are slightly beveled or rounded, as indicated at 25, this practice being customary in all types of bearings where either of the relatively rotatable parts is made up of a plurality of parts. This rounding or beveling may be had on both radial edges of the segments or only on the forward edge.

A bearing housing 27 is supported by the bearing support 12, being spaced from base 13, and the bearing elements 15 and 21. The annular base 13 is provided at its extreme inner surface with a cylindrical tube 28 which is preferably screw-threaded into position, and this tube is of such dimensions as to be entirely free of the shaft 10 and to extend appreciably above the plane of engagement of the bearing surface 24 of the collar 21 and the bearing surfaces 18 of the segments 16, whereby the tube may act as a dam for confining a body of oil in which the active bearing elements are immersed. The annular base 13 is also provided with a plurality of radial ducts 29 which establish fluid communication between the space between the tube 28 and the inner surface of the bearing elements and the space between the housing 27 and the outer surface of the bearing elements.

The housing 27 is filled with oil to a point appreciably above the plane of engagement of the bearing surfaces 24 and 18 and below the upper edge of the tubular element 28, the line II—II indicating a suitable level for the oil. In operation, the oil is free to circulate through the ducts 29 to the space radially within the bearing elements whence it is thrown out by centrifugal force through the space between the segments 16 and across the bearing surfaces 18 and 24. The action of the bearing in operation is such that there is a continual circulation of oil inwardly through the ducts 29 and outwardly across the bearing surfaces and between the segments 16. This action keeps the active bearing elements flooded with a fresh supply of comparatively cool oil.

Through the connection of the segments 16 by means of the pins 19, the thrust due to the shaft 10 and the parts connected therewith is equally distributed throughout the series of segments. It will be apparent that as the weight or thrust of the shaft with its bearing element 21 is applied to the fixed bearing element, those segments or shoes 16 that are highest will first take the load or thrust and will be forced down the spherical surface 14 and radially inward, this movement of the initially high shoes causing a wedging upward and outward of those shoes which may be in lower positions until the active bearing surfaces are in approximately the same plane and all the segmental shoes carry approximately the same load.

The movement of each of the segments 16 relative to the base 13 may be limited through a pin and slot arrangement, indicated at 30, a pin in one of the elements passing into an enlarged slot or groove in the other element.

Figure 4:
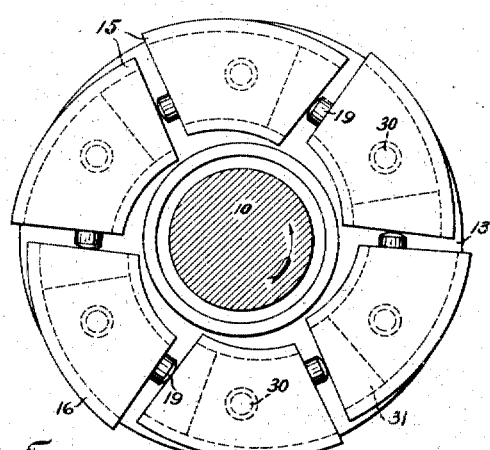
Fig. 4 is an enlarged plan view quite similar to Fig. 2 with the segments of the fixed bearing element displaced from normal position and occupying the positions assumed during the normal operation of the shaft with which the bearing is associated.
Figure 5:
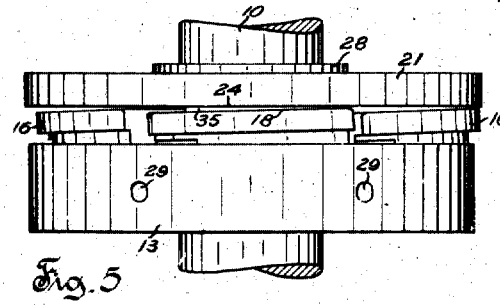
Fig. 5 is a view in elevation of portions of the bearing structure of Fig. 1, but with the segments of the relatively fixed bearing element in the positions indicated in Fig. 4.

It will be apparent that a bearing segment 16 may be shifted on its spherical seat so that the segment may assume the position indicated in Figs. 4 and 5, wherein one radial edge is appreciably lower than the other. When the movement of the segments is so controlled that the lower edge is at the forward side of the bearing element, that is, the side that first comes in contact with a given point on the runner or movable bearing element 21, it will be apparent that a wedge-shaped space is provided between the bearing surfaces of the collar 21 and each of the segments 16, as indicated in Figs. 4 and 5, these wedge-shaped spaces opening toward the forward radial edge of the segments, the direction of rotation of the shaft being indicated by the arrow. With the parts in this latter condition, the oil on the inner side of the bearing elements is drawn into this wedge-shaped space and, when the shaft is operating at a sufficiently high speed, a wedge-shaped film of oil is established in this space and this film is under sufficient pressure to lift the relatively movable bearing element entirely free from engagement with the bearing surfaces 18 of the segments 16. In other words, the pressure or thrust of the movable bearing element is transmitted to the bearing segments 16 only through the body or bodies of oil occupying the wedge-shaped spaces between the segments and the runner bearing element 21, as indicated in Fig. 5. Through the development of this pressure film of oil and the consequent freedom of actual metal to metal contact between the relatively movable bearing elements, the frictional losses in the bearing are greatly reduced.

In order that the segments 16 may automatically and readily assume the positions indicated in Figs. 4 and 5 wherein they are effective to cause the production of this pressure film of oil, each of the segments has a portion cut away on its under side at its forward edge, as indicated at 31. The effect of removing this material is to reduce the area of the spherical bearing surface 17 at the under side of each of the shoes, so that while the center of thrust on the upper side or bearing surface 18 of a segment is in the center of this bearing surface, the center of support or reaction pressure on the under side is shifted or circumferentially offset from the center of the segment toward the rear edge thereof. This results in the production of a turning moment about the center of reaction pressure at the center of the actual spherical bearing surface 17 on the lower side of the segment. Due to the fact that there is a surface contact of considerable area between the lower side of each segment and the spherical seat 14 of the base 13, this turning moment about the center of reaction pressure on the spherical surface 17 is incapable of causing a tilting of the segment so as to bring its forward edge downward. However, this turning moment may be sufficient to cause such shifting of each of the segments as draws the forward edge downward and radially inward and the rear edge upward and radially outward to the positions generally indicated in Figs. 4 and 5.

Figure 2:
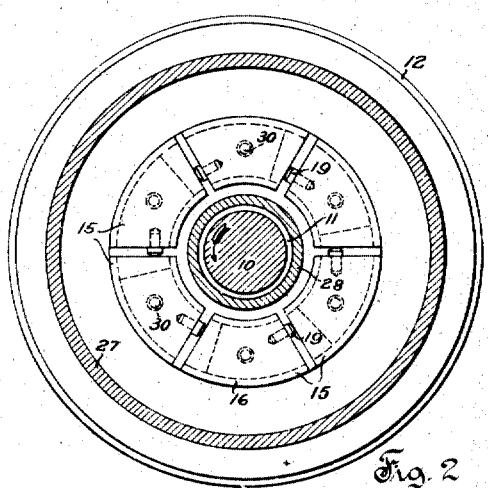
Fig. 2 is a sectional plan view along the line II—II of Fig. 1.
Figure 3:
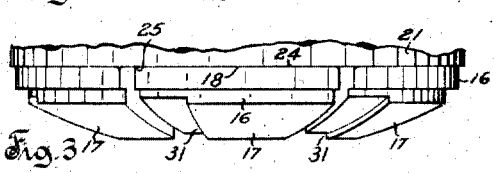
Fig. 3 is an enlarged view in elevation of the relatively fixed element of the bearing structure of Fig. 1.

While the segments 16 tend to assume the positions indicated in Figs. 4 and 5, there will hardly be any actual shift from the positions indicated in Figs. 1, 2 and 3 while the shaft is at rest. However, when the shaft is in operation, oil is drawn between the bearing surfaces of the collar 21 and the segments 16. The oil enters the space between the coöperative relatively movable bearing surfaces at the forward edges of the segments 16, the rounded or beveled edges 25 facilitating this action, and pressure exerted through this oil acts to shift the forward edge of the segments downward and radially inward, the general effect being to shift the segments into the positions indicated in Figs. 4 and 5.

It will be seen then that the pressure developed in the oil as it is drawn between the active bearing surfaces, when there is relative movement between these parts, is sufficient to cause such shifting of the segments 16 as brings them into the positions indicated in Figs. 4 and 5, wherein wedge-shaped films of oil, thicker at the forward edges than at the rear edges, are produced between the segments and the rotatable bearing element 21.

Figure 6:
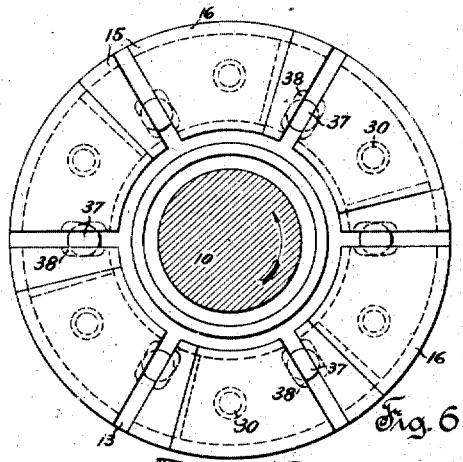
Fig. 6 is a plan view of parts of a modified form of the bearing shown in Figs. 1 to 5.
Figure 7:
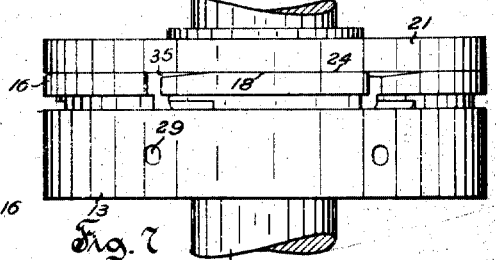
Fig. 7 is a view in elevation of the bearing structure shown in Fig. 6.

Figs. 6 and 7 show a modification of the bearing structure of Figs. 1 to 5, inclusive. In the modified bearing, however, the forward edges of the bearing segments 16 are beveled to a considerable extent at their bearing surfaces 18, as indicated at 35, to produce a wedge-shaped space of considerable size between each segment and the runner 21, which is effective, during operation of the shaft 10, to produce or assist in producing the desired film of oil under pressure between the coöperative bearing surfaces of the collar 21 and each of the segments 16. This beveled forward edge of the bearing surface of the segments may be considered as capable of starting the development or building of the desired pressure film between the segments 16 and the bearing collar 21, this pressure film being effective, at a certain speed of rotation, to cause lifting of the bearing collar 21 from actual engagement with the segments 16 and shifting of the segments to the positions indicated in Figs. 4 and 5.

In the modified structure of Figs. 6 and 7, the means for spacing apart the individual segments 16 are in the form of balls 37 coöperating with guide-ways 38 in opposing edges of adjacent bearing shoes or segments. The general effect and operation of this type of spacing means is quite similar to that of Figs. 1 to 5, inclusive, wherein pins 19 are effective to space and cause equalization of the pressure upon the several bearing segments.

Independent of the fact that the individual bearing segments 16 are capable of being shifted to the positions indicated in Figs. 4 and 5 wherein wedge-shaped films of oil may exist between the bearing segments and the bearing collar 23, certain advantages are to be derived from the construction shown in Figs. 6 and 7 wherein the forward edges of the bearing segments are beveled at the bearing surfaces. Even though the bearing segments be held against movement to the positions indicated in Figs. 4 and 5, this beveling of the bearing surfaces to produce wedge-shaped spaces 35 may be effective to cause the production of the desired pressure film of oil between the bearing surfaces of the segments and the bearing collar 21.

It will be apparent that the invention disclosed is such as provides a thrust bearing construction capable of automatically equalizing the thrust of a shaft, and also automatically causing the development of a film of lubricating material under pressure between the active bearing surfaces of the relatively movable bearing elements.

While the above explanation may not be exact as to all details of the physical effects attending the development and maintenance of wedge-shaped films of lubricating fluid between the active bearing surfaces of the bearing segments and the bearing element attached to the shaft, nevertheless, it is certain that desirable operating results may be secured by the new and useful bearing structures illustrated and described.

It should be understood that it is not desired that the invention claimed be limited to the exact details of construction shown and described, for obvious modifications will occur to a person skilled in the art.

It is claimed and desired to secure by Letters Patent:

1. A bearing comprising relatively movable bearing elements having coöperative bearing surfaces, one of said bearing elements being in the form of a ring made up of a plurality of bearing members, and a beveled seat for said bearing members, said bearing members being supported upon said seat through surface engagement therewith and being shiftable thereon to change the plane of their active bearing surfaces.

2. A bearing comprising relatively movable bearing elements having coöperative bearing surfaces, one of said bearing elements being in the form of a ring made up of a plurality of circumferentially arranged bearing members, and a beveled seat for said bearing members, said bearing members being supported on said seat through surface engagement therewith and being shiftable thereon to change the plane of their active bearing surfaces, and said bearing members being coöperative to control the shifting thereof on said seat.

3. A bearing comprising relatively movable bearing elements having coöperative bearing surfaces, and a member provided with a spherical seat, one of said bearing elements being in the form of a ring made up of a plurality of bearing members each of said members having a spherical surface of the same curvature as said seat and being supported on said seat through surface engagement therewith, and said members being shiftable upon said spherical seat to change the position of the plane of their active bearing surfaces.

4. A thrust bearing comprising relatively rotatable bearing elements, one of said bearing elements comprising a plurality of circumferentially arranged bearing members, a member provided with a beveled seat upon which said segmental bearing members are supported through surface engagement therewith, and means coöperative with and supported by said bearing members and effective to equalize the thrust thereon due to the other one of said bearing elements.

5. A thrust bearing comprising relatively movable and coöperative bearing elements, one of said bearing elements comprising a plurality of circumferentially spaced bearing members each having a beveled seating surface, a member providing a correspondingly beveled seat for said bearing members, and means associated with said bearing members for causing shifting of said members on said seat to equalize the thrust on said members due to the other bearing element.

6. A thrust bearing comprising relatively rotatable bearing elements, one of said bearing elements being in the form of a segmental ring, a beveled seat for said segmental bearing element, and means supported by and associated with the individual segments of said latter bearing element for holding said segments in spaced relation and in operative position upon said seat, said segments being freely shiftable whereby the bearing surfaces thereof may be moved out of the normal plane of engagement between the coöperative bearing elements.

7. A thrust bearing comprising relatively movable bearing elements having coöperative bearing surfaces, one of said bearing elements being made up of a plurality of separate bearing members, and a beveled seat for said bearing members, said bearing members being supported on said seat through surface engagement therewith and being shiftable upon said seat to space from said other bearing element the forward edge of each of said members, and said members being coöperative to cause equalization of the thrust thereon due to the other of said bearing elements.

8. A thrust bearing comprising a rotatable bearing element, a relatively stationary bearing element in the form of a segmental ring, the individual segments of said latter bearing element being independently movable, a member provided with a spherical seat, said segmental bearing elements being supported in operative position on said seat through surface engagement therewith, and means supported wholly by said segmental bearing element for spacing said segments apart and effecting an equalization of the thrust thereon due to said rotatable bearing element.

9. A thrust bearing comprising relatively rotatable and coöperative bearing elements, one of said bearing elements comprising a plurality of bearing members, an element upon which said bearing members are movably supported, and means associated with and supported wholly by said bearing members for causing shifting thereof relatively to said supporting element to cause equalization of the thrust on said bearing members due to the other one of said bearing elements.

10. A thrust bearing comprising relatively rotatable and coöperative bearing elements, one of said bearing elements comprising a plurality of bearing members, an element upon which said bearing members are movably supported, and means comprising parts associated with and carried by opposing portions of adjacent bearing members for causing shifting thereof upon said supporting element to cause equalization of the thrust on said bearing members due to the other one of said bearing elements.

11. A thrust bearing comprising relatively rotatable, coöperative bearing elements, one of said bearing elements being of segmental form and having its bearing surface beveled at the forward edge thereof to thereby provide a wedge-shaped space between said segmental bearing element and the coöperative bearing element, and a member providing a beveled seat for said segmental bearing element, said segmental bearing element having surface engagement with said seat and being shiftable thereon to shift the position of the plane of the bearing surface of said segmental bearing element.

12. A thrust bearing comprising relatively rotatable, coöperative bearing elements, one of said bearing elements comprising a plurality of relatively movable bearing members, and each of said bearing members having its bearing surface beveled at the forward edge thereof to thereby provide a wedge-shaped space between the bearing member and the bearing surface of the coöperative bearing element.

13. A thrust bearing comprising a rotatable bearing element, a relatively stationary bearing element coöperative with said rotatable bearing element, said stationary bearing element comprising a plurality of bearing members of segmental form, an element provided with a spherical seat, the individual segmental bearing members being formed with spherical seating surfaces and being supported in operative position on said seating element through surface engagement therewith, each of said segmental bearing members having its bearing surface beveled at the forward edge thereof to thereby provide a wedge-shaped space between the bearing member and the coöperative rotatable bearing element, and means carried by said segmental bearing members for spacing said members and effecting an equalization of the thrust thereon due to said rotatable bearing element.

14. A bearing comprising relatively movable and coöperative bearing elements, and an inclined seat upon which one of said bearing elements is carried and with which said element has surface engagement, said element having the center of its seating surface circumferentially offset from the center of thrust on said element.

15. A thrust bearing comprising relatively movable and coöperative bearing elements, one of said bearing elements comprising a plurality of bearing members, a spherical seat upon which said latter bearing members are carried and with which said bearing members have surface engagement, each of said bearing members having the center of its spherical seating surface at the rear side of the center of applied pressure on the bearing member whereby the pressure on the bearing surfaces of said members is effective to cause shifting of said members to lower the forward edges thereof and provide wedge-shaped spaces between the other one of said bearing elements and said bearing members.

16. A bearing comprising relatively movable bearing elements having coöperative bearing surfaces, a member provided with a spherical seat, one of said bearing elements being made up of a plurality of bearing members supported upon said seat through surface engagement therewith, a portion of each of said latter bearing members being removed adjacent the forward edge of its spherical seat to thereby reduce the area of its seating surface and cause the center of pressure on the bearing member due to the thrust of the coöperative bearing element to be at the forward side of the center of the spherical seating surface of the bearing member.

In testimony whereof, the signature of the inventor is affixed hereto.

ARTHUR J BROWN.

It is hereby certified that in Letters Patent No. 1,279,644, granted September 24, 1918, upon the application of Arthur J. Brown, of Milwaukee, Wisconsin, for an improvement in "Bearings," an error appears in the printed specification requiring correction as follows: Page 1, line 107, before the word "serve" insert the commas and words , *when used,* ; and that the said Letters Patent should be read with this correction therein that the same may conform to the record of the case in the Patent Office.

Signed and sealed this 26th day of November, A. D., 1918.

[SEAL.]

R. F. WHITEHEAD,
*Acting Commissioner of Patents.*

Cl. 64—25.